United States Patent [19]

Thomason et al.

[11] Patent Number: 5,794,425
[45] Date of Patent: Aug. 18, 1998

[54] LAWN DEBRIS COLLECTING SYSTEM AND METHOD

[75] Inventors: Scott Thomason, Maple Heights; Daniel J. Martens, Brooklyn, both of Ohio

[73] Assignee: MTD Products Inc., Cleveland, Ohio

[21] Appl. No.: 707,591

[22] Filed: Sep. 5, 1996

[51] Int. Cl.$^6$ ............................................. A01D 34/70
[52] U.S. Cl. ................................... 56/202; 56/16.6
[58] Field of Search ..................... 56/202, 16.6, 16.7, 56/194, 199, 203, 204, 201, 200, 205

[56] References Cited

U.S. PATENT DOCUMENTS

| | | | |
|---|---|---|---|
| 3,949,540 | 4/1976 | Christopherson et al. | 56/202 |
| 4,149,363 | 4/1979 | Woelffer | 56/202 |
| 4,848,070 | 7/1989 | Berglund | 56/16.6 X |
| 4,897,988 | 2/1990 | Schweitz et al. | 56/202 |
| 4,989,400 | 2/1991 | Wark | 56/202 |
| 5,033,258 | 7/1991 | Morse | 56/202 |
| 5,243,809 | 9/1993 | Redding | 56/202 |

FOREIGN PATENT DOCUMENTS

| | | | |
|---|---|---|---|
| 1199182 | 1/1986 | Canada | 56/16.6 |
| 8626525 | 1/1987 | Germany | |

*Primary Examiner*—Terry Lee Melius
*Attorney, Agent, or Firm*—Roger D. Emerson

[57] ABSTRACT

A lawn mower has a grass bag assembly and a chute assembly. The grass bag assembly has a grass bag for holding lawn debris, a grass bag door for releasing stored lawn debris from the grass bag, a support rod connected to the handle bar of the mower, and support pins connected to the body of the mower. The chute assembly has a chute which is used to transport the lawn debris from the body of the mower to the grass bag, and a chute door. As the grass bag is lifted off the apparatus body, it causes the chute door to pivot about the chute. The pivoting chute door moves the extended pull rope of the mower out of the way of the grass bag. The grass bag can then be fully removed from the apparatus body and emptied of its lawn debris. Finally, the chute door is raised so that the empty grass bag can be repositioned onto the apparatus body.

24 Claims, 5 Drawing Sheets

LAWN DEBRIS COLLECTING SYSTEM AND METHOD

BACKGROUND OF THE INVENTION

1. Field of Invention

This invention pertains to the art of methods and apparatuses for use in lawn and garden care, and more specifically to methods and apparatuses for use in collecting lawn debris that has been cut by a walk-behind lawn mower.

2. Description of the Related Art

It is well known to provide apparatuses, specifically lawn and garden apparatuses such as a walk-behind lawn mower, with apparatuses and methods for collecting grass clippings and other lawn debris that has been cut. Typically, such mowers have a grass bag for holding the lawn debris and a chute which is used to transport the lawn debris from the body of the mower and the cutting blade to the grass bag. It is often necessary to remove the grass bag so that the lawn debris can be discarded. After it is emptied the empty grass bag then is repositioned on the mower.

A common problem encountered in the art is the time and effort required to remove the grass bag. Often some type of latch or latches must be loosened or moved before the grass bag can be removed. Then once the empty grass bag is repositioned, the latches must be re-tightened or moved back into place.

Another problem encountered in the art deals with the location of the pull rope. The pull rope, which must be pulled in order to start a manual start lawn mower motor, often extends from the engine and over at least a portion of the grass bag. Removal and repositioning of the grass bag straight up through the handles often requires the operator to use one hand to hold the pull rope aside. This requires the operator to reposition the grass bag with only one hand.

The present invention provides methods and apparatuses for reducing these problems. The difficulties inherent in the art are therefore overcome in a way which is simple and efficient, while providing better and more advantageous results.

SUMMARY OF THE INVENTION

In accordance with one aspect of the invention there is provided a lawn debris collecting system for use with an associated apparatus having a body, a handle bar, cutting means for cutting associated vegetation, and an extended pull rope. The lawn debris collecting system has a grass bag assembly for holding the lawn debris and a chute assembly which is used to transport the lawn debris from the body of the mower to the grass bag assembly. The chute assembly has a chute and a door. When the grass bag assembly is being lifted from the body of the apparatus, the door of the chute assembly is automatically raised. As the door is raised, it moves the extended pull rope out of the way of the grass bag.

In accordance with another aspect of the present invention, there is provided a grass bag assembly for use with an associated apparatus having a body, a handle bar, cutting means for cutting associated vegetation, and connecting means for connecting the apparatus body to the grass bag assembly. The grass bag assembly has a grass bag for holding the lawn debris, a rod for supporting the grass bag from the handle bar, pins for supporting the grass bag from the apparatus body, and a grass bag door for releasing stored lawn debris from the grass bag. The grass bag door, which pivotably opens and closes the grass bag, has pin slots which fit over the pins. To remove the grass bag, it is only necessary to lift it off of the supporting rod and pins.

In accordance with another aspect of the present invention, there is provided a method for emptying a grass bag. As the grass bag is lifted off the apparatus body, it causes the door of the chute assembly to pivot about the chute. The pivoting door moves the extended pull rope out of the way of the grass bag. The grass bag can then be fully removed from the apparatus body and emptied of its lawn debris. Finally, the door of the chute assembly is raised so that the empty grass bag can be repositioned onto the apparatus body.

One advantage of the invention is that the grass bag is easily removed and repositioned. No latches or hooks are necessary.

Another advantage of the invention is that the grass bag support is simple. Only a rod connected to the handle bar and support pins connected to the body are required.

Another advantage of the invention is that the extended pull rope is automatically moved out of the way as the grass bag is removed.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
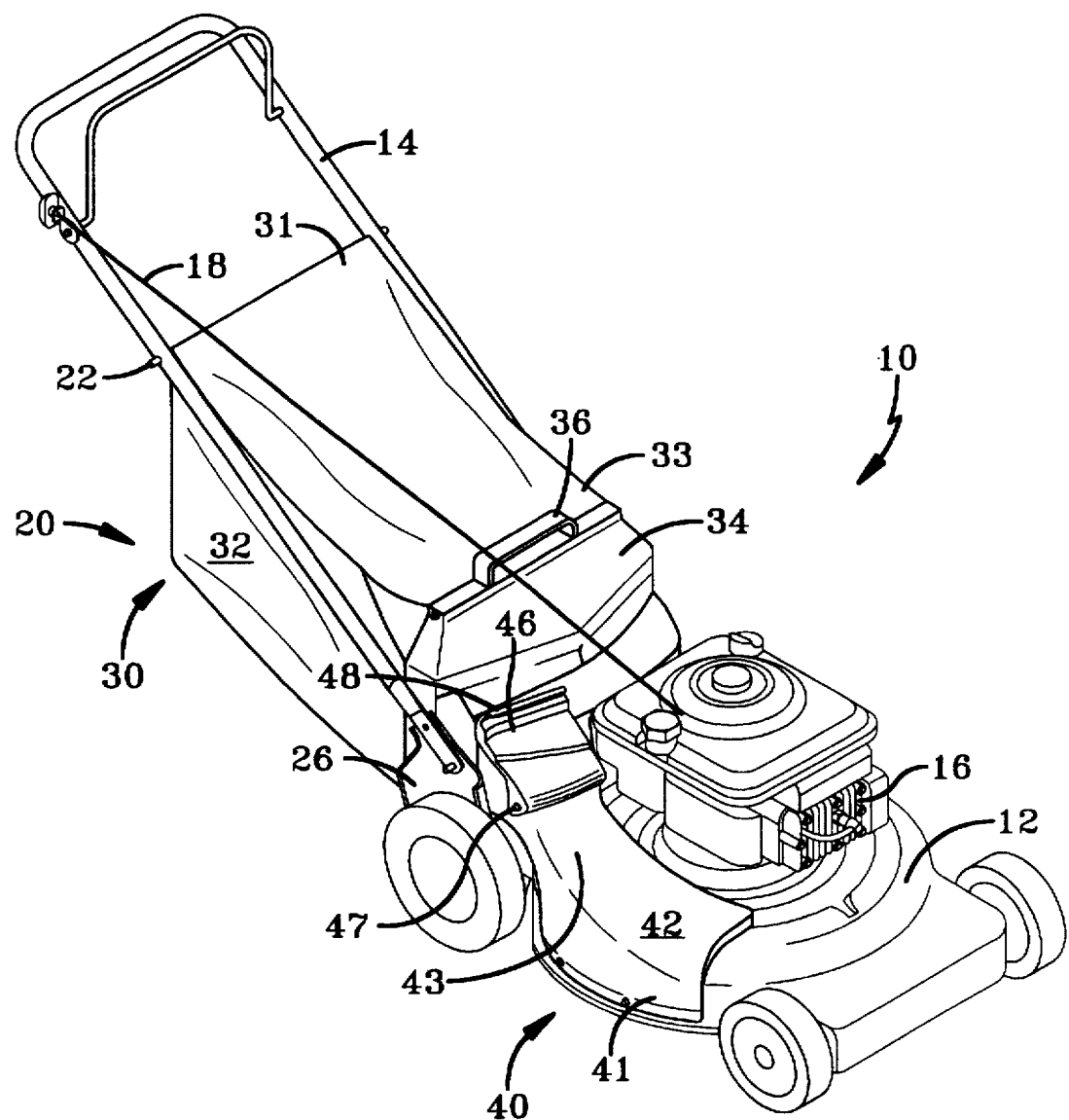
FIG. 1 shows a typical walk-behind lawn mower using the lawn debris collecting system of this invention.
Figure 2:
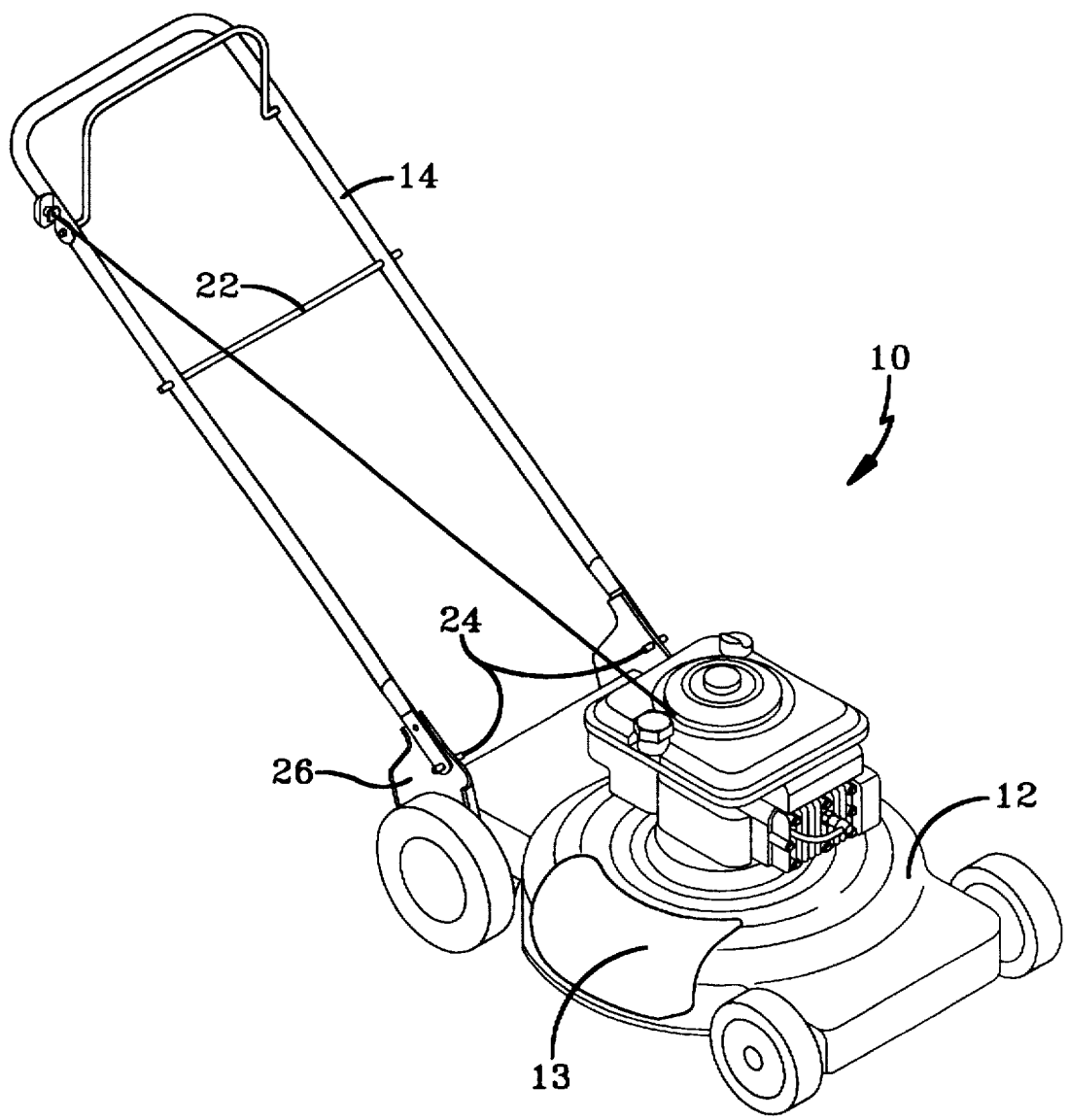
FIG. 2 shows the same lawn mower as in FIG. 1 without the grass bag and chute assembly.

Referring now to the drawings wherein the showings are for purposes of illustrating a preferred embodiment of the invention only and not for purposes of limiting the same, FIG. 1 shows a lawn mower 10 having a cutting blade (not shown) which is equipped with the present invention, a lawn debris collecting system 20. This preferred embodiment includes a typical walk-behind lawn mower used on a lawn but the invention is applicable to riding mowers, off the road apparatuses, different terrains, and other applications as well. The lawn mower 10 has a body 12, a handle bar 14, a motor 16 which rotates a cutting blade (not shown), and an extended pull rope 18 which is used to start the motor 16. The lawn debris collecting system 20 has a grass bag assembly 30 for holding lawn debris and a chute assembly 40 which is used to transport the lawn debris from the body 12 of the lawn mower 10 to the grass bag assembly 30. FIG. 2 shows that the body 12 of the lawn mower 10 has a lawn debris opening 13 where law debris is discarded by the cutting blade (not shown).

Figure 3:
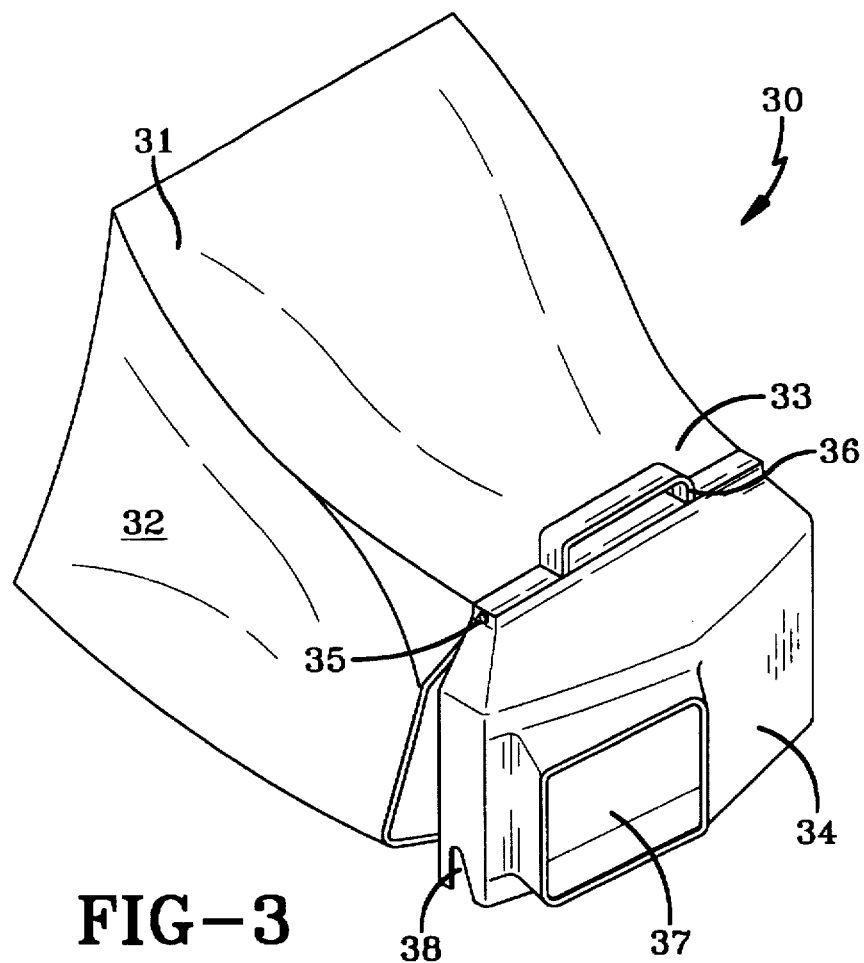
FIG. 3 is a sectional view of the grass bag assembly of this invention with the grass bag door slightly open.
Figures 4, 5:
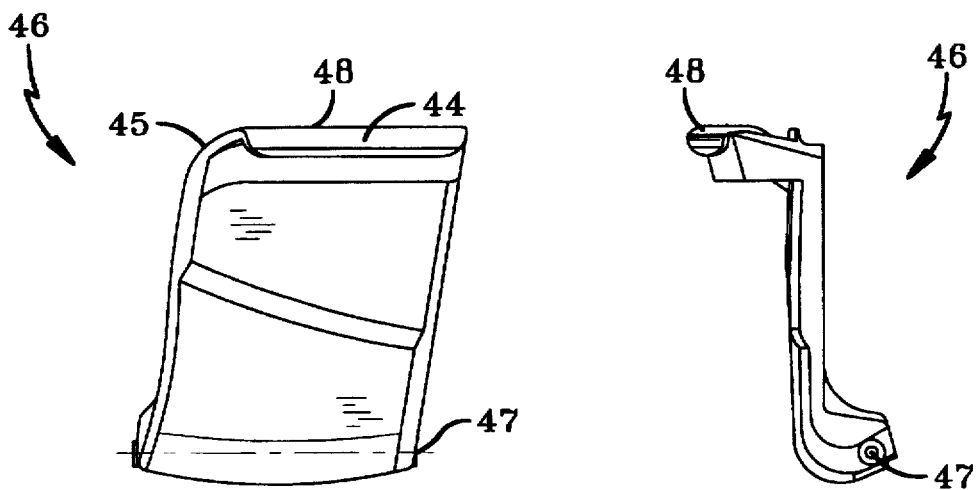
FIG. 4 is a front view of the chute door of this invention.
FIG. 5 is a side view of the chute door of this invention.

With reference to FIGS. 1-3, the grass bag assembly 30 has a grass bag 32 for holding lawn debris that has a first end 31 and a second end 33. At the second end 33 of the grass bag 32 a grass bag door 34 is pivotably connected by a pivot rod 35. The grass bag door 34 has a handle 36, a chute opening 37, and pin slots 38. The grass bag 32 is supported at its first end 31 by support rod 22 which is attached to the handle bar 14. The grass bag 32 is supported at its second end 33 using grass bag door 34 and by support pins 24 which are attached to the body 12 of the lawn mower 10 by support brackets 26. The pin slots 38 of the grass bag door 34 fit on the support pins 24.

With reference to FIGS. 1-5, the chute assembly 40 has a chute 42 which connects at first end 41 to the lawn debris opening 13 in the body 12 of the lawn mower 10. The second end 43 of the chute 42 connects to the chute opening 37 on the grass bag door 34. The chute assembly 40 also has a chute door 46 which is pivotable about pivot rod 47. The chute door 46 has a rope contact region 48 for contacting the extended pull rope 18. The rope contact region 48 has a first end 44 and a second end 45. The chute door 46 has a spring (not shown) biasing the chute door 46 in the closed position. As the chute door 46 is opened, the extended pull rope 18 is moved from contacting the first end 44 of the rope contact region to contacting the second end 45.

Figure 6:
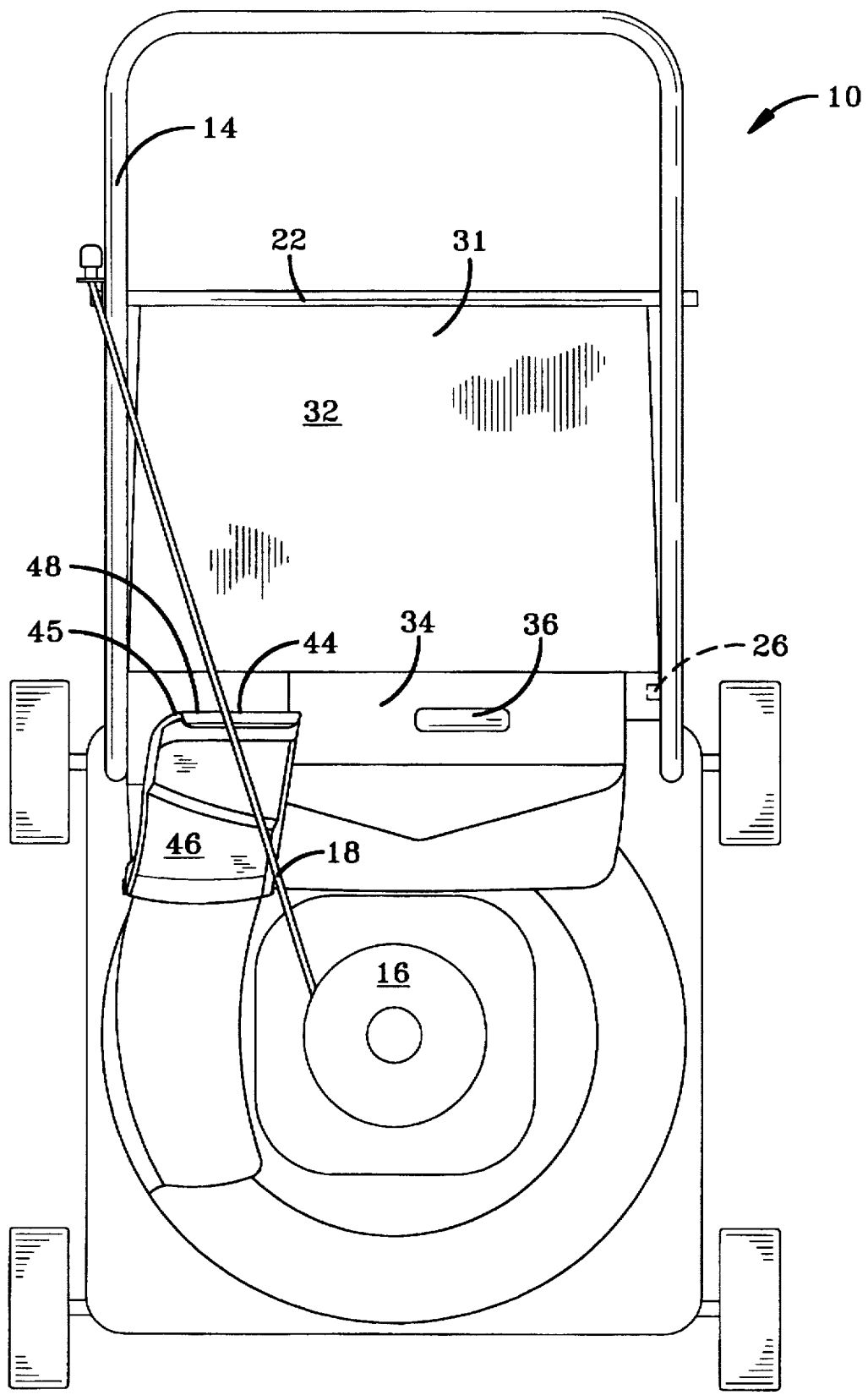
FIG. 6 is a simplified top view of the lawn mower of FIG. 1 showing the extended pull rope in its normal position over the grass bag; and, FIG. 7 is a simplified top view of the lawn mower of FIG. 1 showing the extended pull rope no longer positioned over the grass bag.

With reference now to FIG. 6, it can be seen that the extended pull rope 18 extends from the motor 16 over the chute door 46, over the grass bag 32 to the handle bar 14 of the lawn mower 10. To remove the grass bag 32, an operator would place one hand on the handle 36 of the grass bag door 34, the other hand on the first end 31 of the grass bag 32, and lift. It is convenient for the operator to use two hands to remove the grass bag 32 as it is likely that it is full of lawn debris. As the operator lifts, the grass bag door 34 contacts the chute door 46 causing it to pivot up till the first end 44 of the rope contact region 48 comes into contact with the extending pull rope 18. As the operator continues to lift, the extending pull rope 18 is moved to the second end 45 of the rope contact region 48.

Figure 7:
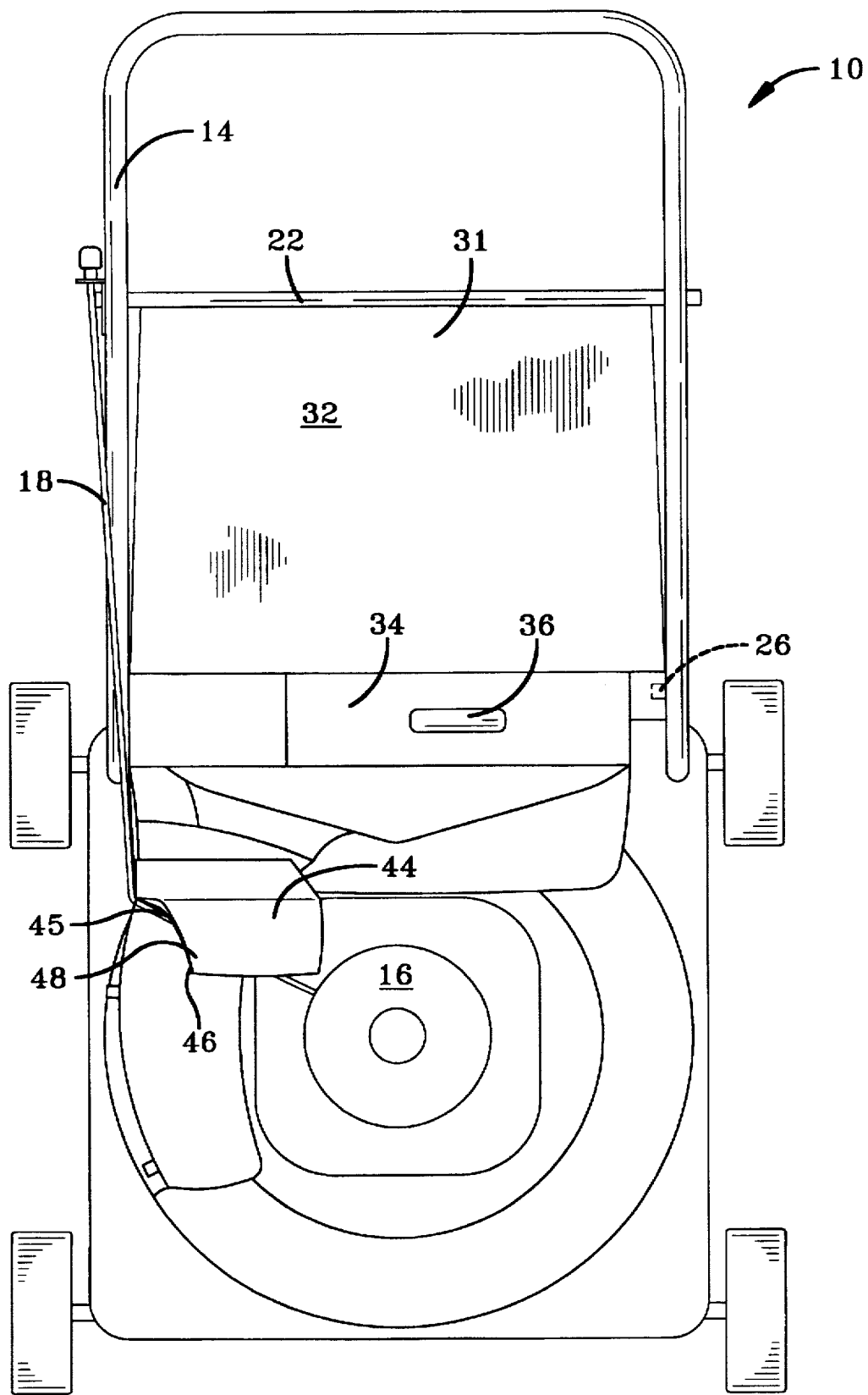

This lifting, as shown in FIG. 7, would move the extended pull rope 18 so that it would no longer be positioned over the grass bag 32. The grass bag 32 would thus be free to be completely removed from the lawn mower 10. To place the grass bag 32 back into place, the operator would place one hand on the handle 36 of the grass bag door 34 and the other hand on the chute door 46. The operator would then lift the chute door 46, since it is spring loaded closed, and place the grass bag 32 back onto its supports, the support rod 22 and the support pins 26. It is convenient for the operator to use one hand to reposition the grass bag 32 as it is likely that it is empty of lawn debris.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A lawn debris collecting system for use with an associated apparatus, the apparatus having a body with a lawn debris opening, a handle bar, motor means for selectively rotating cutting means used in cutting associated vegetation, and an extended pull rope for starting the motor means, the extended pull rope extending from the motor means over the lawn debris collecting system to the handle bar, the lawn debris collecting system comprising:

a grass bag assembly for holding lawn debris; and, a chute assembly for connecting the lawn debris opening of the body to said grass bag assembly, said chute assembly having a chute and a door, said door moving the extended pull rope from over said grass bag assembly as said grass bag assembly is lifted for removal.

2. The lawn debris collecting system of claim 1 wherein said door comprises:

a rope contact region for contacting the extended pull rope, said rope contact region having first and second ends, said first end of said rope contact region selectively coming in contact with the extended pull rope, said second end of said rope contact region subsequently coming in contact with the extended pull rope.

3. The lawn debris collecting system of claim 1 wherein said grass bag assembly comprises:

a grass bag for holding the lawn debris;

a grass bag door having first and second slots, said grass bag door being operatively connected to said grass bag, said grass bag door being operatively connected to said chute; and, supporting means for supporting said grass bag and said grass bag door, said first and second slots of said grass bag door being operatively associated with said supporting means.

4. The lawn debris collecting system of claim 3 wherein said grass bag has first and second ends, said supporting means comprising:

a rod for supporting said first end of said grass bag, said rod being operatively connected to the handle bar; and, first and second pins for supporting said second end of said grass bag, said first and second pins being operatively connected to the body, said first slot of said grass bag door fitting on said first pin, said second slot of said grass bag door fitting on said second pin.

5. A method for removing a grass bag from an associated apparatus, the grass bag for holding lawn debris, the associated apparatus having a body with a lawn debris opening, a handle bar, supporting means for supporting the grass bag, motor means for selectively rotating cutting means used in cutting associated vegetation, an extended pull rope for starting the motor means, and a chute assembly for connecting the lawn debris opening of the body to the grass bag, the extended pull rope extending from the motor means over the grass bag to the handle bar, the chute assembly having a chute and a door, the door being pivotably connected to the chute, the method comprising the steps of:

beginning to lift the grass bag away from the supporting means;

pivoting the door of the chute assembly about the chute thereby moving the extended pull rope from over the grass bag; and, completing the lifting of the grass bag away from the supporting means.

6. The method of claim 5 wherein the door of the chute assembly has a rope contact region having first and second ends, the step of pivoting the door of the chute assembly about the chute thereby moving the extended pull rope from over the grass bag, comprising the step of:

moving the extended pull rope from the first end of the rope contact region to the second end of the rope contact region.

7. A grass bag assembly for holding lawn debris, the grass bag assembly for use with an associated apparatus having a body with a lawn debris opening, cutting means for cutting associated vegetation, and connecting means for connecting the lawn debris opening of the body to the grass bag assembly, said grass bag assembly comprising:

a grass bag for holding the lawn debris;

a grass bag door, said grass bag door being operatively connected to said grass bag, said grass bag door being operatively connected to the connecting means, said grass bag door having a first slot; and, supporting means for supporting said grass bag and said grass bag door, said first slot of said grass bag door for use with said supporting means.

8. The grass bag assembly of claim 7 further comprising:

a pivot rod operatively connected to said grass bag, said grass bag door selectively pivoting about said pivot rod.

9. The grass bag assembly of claim 7 wherein said grass bag door has a chute opening, said chute opening for connecting said grass bag with the connecting means.

10. The grass bag assembly of claim 7 wherein said grass bag has a handle.

11. The grass bag assembly of claim 7 wherein the associated apparatus has a handle bar, said grass bag having first and second ends, said supporting means comprising:

a rod for supporting said first end of said grass bag, said rod being operatively connected to the handle bar; and, a first pin for supporting said second end of said grass bag, said first pin being operatively connected to the body, said first slot of said grass bag door fitting on said first pin.

12. The grass bag assembly of claim 11 wherein said supporting means has a second pin for supporting said second end of said grass bag, the grass bag door further comprising:

a second slot, said second slot of said grass bag door fitting on said second pin.

13. A chute assembly for use with an associated apparatus, the apparatus having a body with a lawn debris opening, motor means for selectively rotating cutting means used in cutting associated vegetation, a grass bag for holding lawn debris, and an extended rope, the extended rope extending from the motor means over the grass bag, the chute assembly comprising:

a chute having first and second ends, said first end of said chute being operatively connected to the lawn debris opening, said second end of said chute being operatively connected to the grass bag; and, a chute door selectively moving the extended rope from over the grass bag as the grass bag is lifted for removal.

14. The chute assembly of claim 13 further comprising:

a pivot rod operatively connected to said chute, said chute door selectively pivoting about said pivot rod.

15. The chute assembly of claim 13 wherein said chute door comprises:

a rope contact region for contacting the extended rope, said rope contact region having first and second ends, said first end of said rope contact region selectively coming in contact with the extended rope, said second end of said rope contact region subsequently coming in contact with the extended rope.

16. The chute assembly of claim 13 further comprising:

a spring for biasing said chute door in the closed position.

17. A method for emptying a grass bag, the grass bag for holding lawn debris, the grass bag for use with an associated apparatus having a body with a lawn debris opening, a handle bar, supporting means for supporting the grass bag, motor means for selectively rotating cutting means used in cutting associated vegetation, an extended pull rope for starting the motor means, and a chute assembly for connecting the lawn debris opening of the body to the grass bag, the extended pull rope extending from the motor means over the grass bag to the handle bar, the chute assembly having a chute and a door, the door being pivotably connected to the chute, the method comprising the steps of:

beginning to lift the grass bag away from the supporting means;

pivoting the door of the chute assembly about the chute thereby moving the extended pull rope from over the grass bag;

completing the lifting of the grass bag away from the supporting means;

emptying the grass bag;

lifting the door of the chute assembly; and, repositioning the grass bag onto the supporting means.

18. The method of claim 17 wherein the door of the chute assembly has a rope contact region for contacting the extended rope, the rope contact region having a first end, the step of pivoting the door of the chute assembly about the chute thereby moving the extended pull rope from over the grass bag, comprising the step of:

contacting the extended pull rope with the first end of the rope contact region.

19. The method of claim 18 wherein the rope contact region also has a second end, after the step of contacting the extended pull rope with the first end of the rope contact region, said method comprising the step of:

moving the extended pull rope from the first end of the rope contact region to the second end of the rope contact region.

20. The method of claim 17 wherein the grass bag has first and second ends, the second end of the grass bag having a first slot, the supporting means comprising a rod for supporting the first end of the grass bag and a first pin for supporting the second end of the grass bag, the rod being operatively connected to the handle bar, the first pin being operatively connected to the body, the method adding a step after the step of lifting the chute door, the additional step being:

sliding the first slot of the grass bag onto the first pin.

21. A lawn mower, comprising:

a body having a lawn debris opening;

a handle bar operatively connected to said body;

cutting means for use in cutting associated vegetation;

motor means for selectively rotating said cutting means;

an extended pull rope for selectively starting said motor means, said extended pull rope extending from said motor means to said handle bar; and, a lawn debris collecting system including, (a) a grass bag assembly for holding lawn debris, said extended pull rope extending over said grass bag assembly, (b) a chute assembly for connecting said lawn debris opening to said grass bag assembly, said chute assembly including, (i) a chute and, (ii) a door, said door moving said extended pull rope from over said grass bag assembly as said grass bag assembly is lifted for removal.

22. The lawn mower of claim 21 wherein said door comprises:
 a rope contact region for contacting said extended pull rope, said rope contact region having first and second ends, said first end of said rope contact region selectively coming in contact with said extended pull rope, said second end of said rope contact region subsequently coming in contact with said extended pull rope.

23. The lawn mower of claim 21 wherein said grass bag assembly comprises:
 a grass bag for holding the lawn debris;
 a grass bag door having first and second slots, said grass bag door being operatively connected to said grass bag, said grass bag door being operatively connected to said chute; and,
 supporting means for supporting said grass bag and said grass bag door, said first and second slots of said grass bag door for use with said supporting means.

24. The lawn mower of claim 23 wherein said grass bag has first and second ends, said supporting means comprising:
 a rod for supporting said first end of said grass bag, said rod being operatively connected to said handle bar; and,
 first and second pins for supporting said second end of said grass bag, said first and second pins being operatively connected to said body, said first slot of said grass bag door fitting on said first pin, said second slot of said grass bag door fitting on said second pin.

* * * * *